(12) United States Patent
Choquette et al.

(10) Patent No.: US 7,337,339 B1
(45) Date of Patent: Feb. 26, 2008

(54) MULTI-LEVEL POWER MONITORING, FILTERING AND THROTTLING AT LOCAL BLOCKS AND GLOBALLY

(75) Inventors: Jack H. Choquette, Mountain View, CA (US); Kevin B. Normoyle, Santa Clara, CA (US); Elias Atmeh, San Jose, CA (US); Scott D. Sellers, Menlo Park, CA (US); Murali Sundaresan, Sunnyvale, CA (US); Manuel Gautho, Los Gatos, CA (US)

(73) Assignee: Azul Systems, Inc., Mountain View, CA (US)

( * ) Notice: Subject to any disclaimer, the term of this patent is extended or adjusted under 35 U.S.C. 154(b) by 349 days.

(21) Appl. No.: 11/162,578

(22) Filed: Sep. 15, 2005

(51) Int. Cl.
*G06F 1/26* (2006.01)
*G06F 1/32* (2006.01)

(52) U.S. Cl. ...................... 713/320; 713/300
(58) Field of Classification Search ................ 713/300, 713/320
See application file for complete search history.

(56) References Cited

U.S. PATENT DOCUMENTS

| | | | |
|---|---|---|---|
| 5,339,445 A | 8/1994 | Gasztonyi | 713/324 |
| 5,586,332 A | 12/1996 | Jain et al. | 713/322 |
| 5,623,647 A | 4/1997 | Maitra | 713/501 |
| 6,304,978 B1 | 10/2001 | Horigan et al. | 713/322 |
| 6,415,388 B1 | 7/2002 | Browning et al. | 713/322 |
| 6,498,460 B1 | 12/2002 | Atkinson | 320/135 |
| 6,525,593 B1 | 2/2003 | Mar | 327/530 |
| 6,751,741 B1 | 6/2004 | Kawahara et al. | 713/320 |
| 6,810,482 B1 * | 10/2004 | Saxena et al. | 713/320 |
| 6,845,456 B1 * | 1/2005 | Menezes et al. | 713/320 |
| 6,871,119 B2 | 3/2005 | Samson et al. | 700/299 |
| 6,889,330 B2 | 5/2005 | Chauvel et al. | 713/300 |
| 6,889,332 B2 | 5/2005 | Helms et al. | 713/322 |
| 6,986,069 B2 * | 1/2006 | Oehler et al. | 713/320 |
| 7,127,594 B2 * | 10/2006 | Sasagawa | 712/229 |
| 2002/0087901 A1 | 7/2002 | Cooper et al. | 713/320 |

(Continued)

OTHER PUBLICATIONS

Intel Corp. "Intel 820 Chipset Family: 82820 Memory Controller Hub (MCH) Datasheet", pp. 1-6, 11-17, 128-136, Jul. 2000.

(Continued)

*Primary Examiner*—Chun Cao
*Assistant Examiner*—Jaweed A Abbaszadeh
(74) *Attorney, Agent, or Firm*—Stuart I. Auvinen; gPatent LLC

(57) ABSTRACT

Power management for a multi-processor chip includes a centralized global power manager that monitors global power for the whole chip, and local power managers. Local power managers manage power for local blocks such as processor cores, caches, and memory controllers. When a local block executes an instruction or accesses memory, an event is generated and looked up in a local power estimate table. A local power estimate for that event is sent to the global power manager, which sums all local power estimates received from all local blocks. An exponential moving average (EMA) is generated and compared to a global power threshold. When global power is over the threshold, local targets are sent to power managers that generate and monitor local power averages that must remain under the local target. The local block is throttled by the local power manager to reduce power when the local target is exceeded.

17 Claims, 8 Drawing Sheets

U.S. PATENT DOCUMENTS

| | | |
|---|---|---|
| 2003/0117759 A1 | 6/2003 | Cooper ........................ 361/103 |
| 2003/0126476 A1* | 7/2003 | Greene ........................ 713/300 |
| 2003/0217296 A1 | 11/2003 | Ma ............................. 713/300 |
| 2004/0003303 A1* | 1/2004 | Oehler et al. ................ 713/300 |
| 2004/0163001 A1 | 8/2004 | Bodas ......................... 713/300 |
| 2004/0268166 A1* | 12/2004 | Farkas et al. ................ 713/320 |
| 2005/0044429 A1* | 2/2005 | Gaskins et al. .............. 713/300 |
| 2005/0071701 A1* | 3/2005 | Luick .......................... 713/320 |
| 2006/0053323 A1* | 3/2006 | Kissell ........................ 713/300 |
| 2006/0156041 A1* | 7/2006 | Zaretsky et al. ............. 713/300 |
| 2007/0005152 A1* | 1/2007 | Karr et al. .................... 700/22 |
| 2007/0050647 A1* | 3/2007 | Conroy et al. ............... 713/300 |

OTHER PUBLICATIONS

J. Wei, "Foxton Technology Pushes Processor Frequency, Application Performance", *Technology@Intel Magazine*, pp. 1-5, Sep. 2005.

* cited by examiner

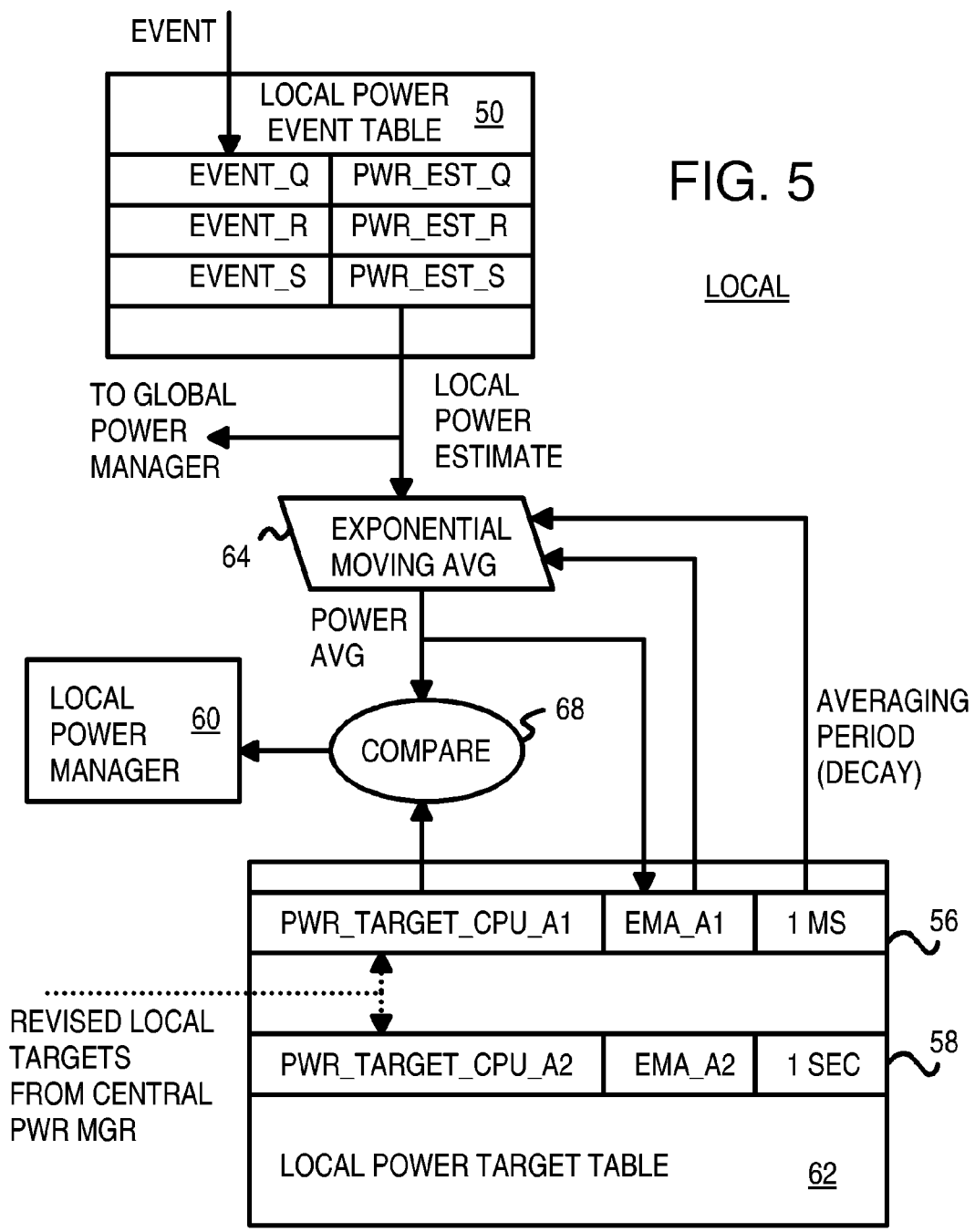

| | |
|---|---:|
| NEW POWER ESTIMATE = | 0100010 |
| OLD EMA = | 1000110 |

| | | |
|---|---:|---:|
| OLD EMA = | | 1000110 |
| SHIFTED OLD EMA = | − | 0100011 |
| SHIFTED NEW POWER ESTIMATE = | + | 0010001 |
| NEW EMA = | | 0110100 |

MULTI-LEVEL POWER MONITORING, FILTERING AND THROTTLING AT LOCAL BLOCKS AND GLOBALLY

FIELD OF THE INVENTION

This invention relates to power management, and more particularly to global and local power management.

BACKGROUND OF THE INVENTION

Improvements in semiconductor processing technologies and design tools have allowed for more and more functions to be integrated together on a single integrated circuit (IC) chip. Such improvements allowed for cache memories to be integrated onto the same chip as a central processing unit (CPU) core. More recently, multiple CPU cores are being integrated onto the same chip along with one or more memories.

As this trend continues, multiple CPU cores and multiple memory blocks will be integrated together. FIG. 1 shows a multi-processor system chip. Processor cores 10, 10', 10" are integrated together onto IC chip 20. Each processor core may execute a separate stream of instructions and each accesses its own local cache memory, caches 12, 12', 12". When data is not found in the local cache memory (a cache miss), memory controllers 14, 14', 14" fetch the desired data from an external memory, such as using an external bus to a large external main memory.

Snoop tags 16 contain directory information about the entries currently being stored in caches 12, 12', 12". Cache coherency is achieved through the use of snoop tags 16, perhaps in conjunction with external directories and other controllers.

The higher integration of functions onto a single silicon die is primarily achieved by using a higher density of transistors. Transistors generate heat as a by-product as do resistances. Transistors operating at a very high frequency may get too hot, even causing some localized melting or other damage, reducing long term reliability. Such heat is drawn away through a package containing the IC chip, but the amount of heat dissipated is limited.

Power management of highly integrated systems is critical to prevent such damage. Power management unit 18 may be included on IC chip 20. Power management unit 18 may be activated by a sensor such as a temperature detector or by a software monitor or program to reduce power consumption on IC chip 20. For example, power management unit 18 may cause processor cores 10, 10', 10" to enter a lower-power state when the sensed temperature is above a limit. The low-power state may be a reduced frequency of operation or periodically halting operation to allow IC chip 20 to cool.

A wide variety of lower-power modes and power management units and techniques are known. However, most are relatively simple and are designed for use with simple systems, such as single-processor chips. While such single-processor power-management techniques could simply be replicated for each of the multiple CPU's on a multi-processor chip, the power management achieved would be disjointed and lack coordination among the many processor-memory clusters sharing the same IC chip die.

What is desired is power management for a more complex multi-processor chip. A power management system that can control multiple CPU cores and multiple memory blocks that can operate independently of one another is desirable. Centrally-coordinated power management of multiple processor-memory clusters is desirable.

BRIEF DESCRIPTION OF THE DRAWINGS

FIG. 5 shows a local power management unit in more detail.

DETAILED DESCRIPTION

The present invention relates to an improvement in multi-processor power management. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have discovered that power consumption can be monitored on a global, or chip-wide level. Power consumption can then be controlled on a local level. Power is thus monitored globally but controlled locally.

The local level can have separate power monitors and controllers for each processor core and each memory block. Power is monitored for the whole chip by a single central power monitor at the global level, but controlled for many local blocks at the local level.

The global power consumption can be compared to one or more global power thresholds. When these global thresholds are exceeded, power must then be reduced. Power is reduced by sending local power targets to each local block. Each local block then monitors its own power consumption. When its local power consumption exceeds its local target, then the local block reduces its power consumption. Local power consumption can be reduced by local throttling, such as by reducing the operating frequency of the local CPU core or local memory block, or completely stopping one or more clocks.

The term "threshold" used herein refers to a limit compared at the global level. The term "target" used herein refers to a limit compared at the local level.

Figure 1:
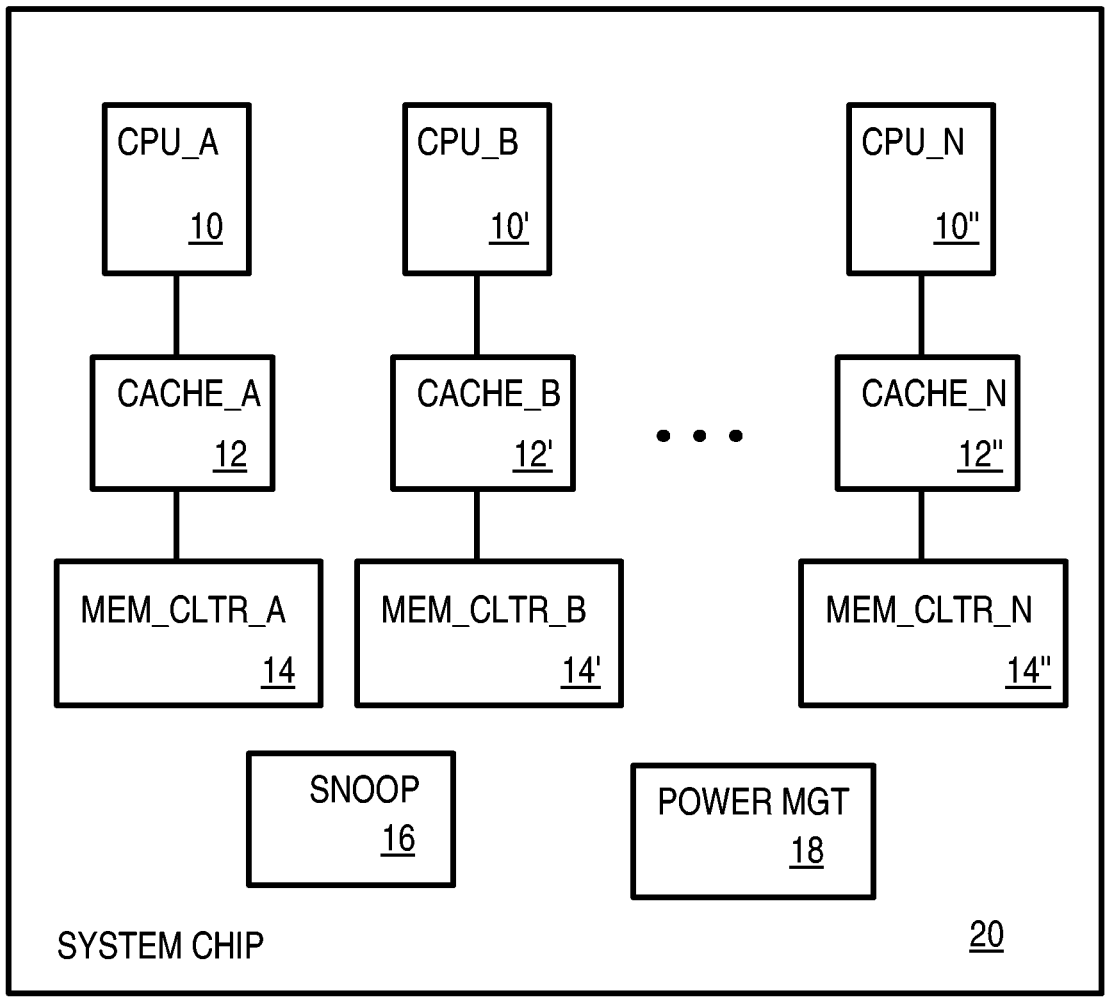
FIG. 1 shows a multi-processor system chip.
Figure 2:
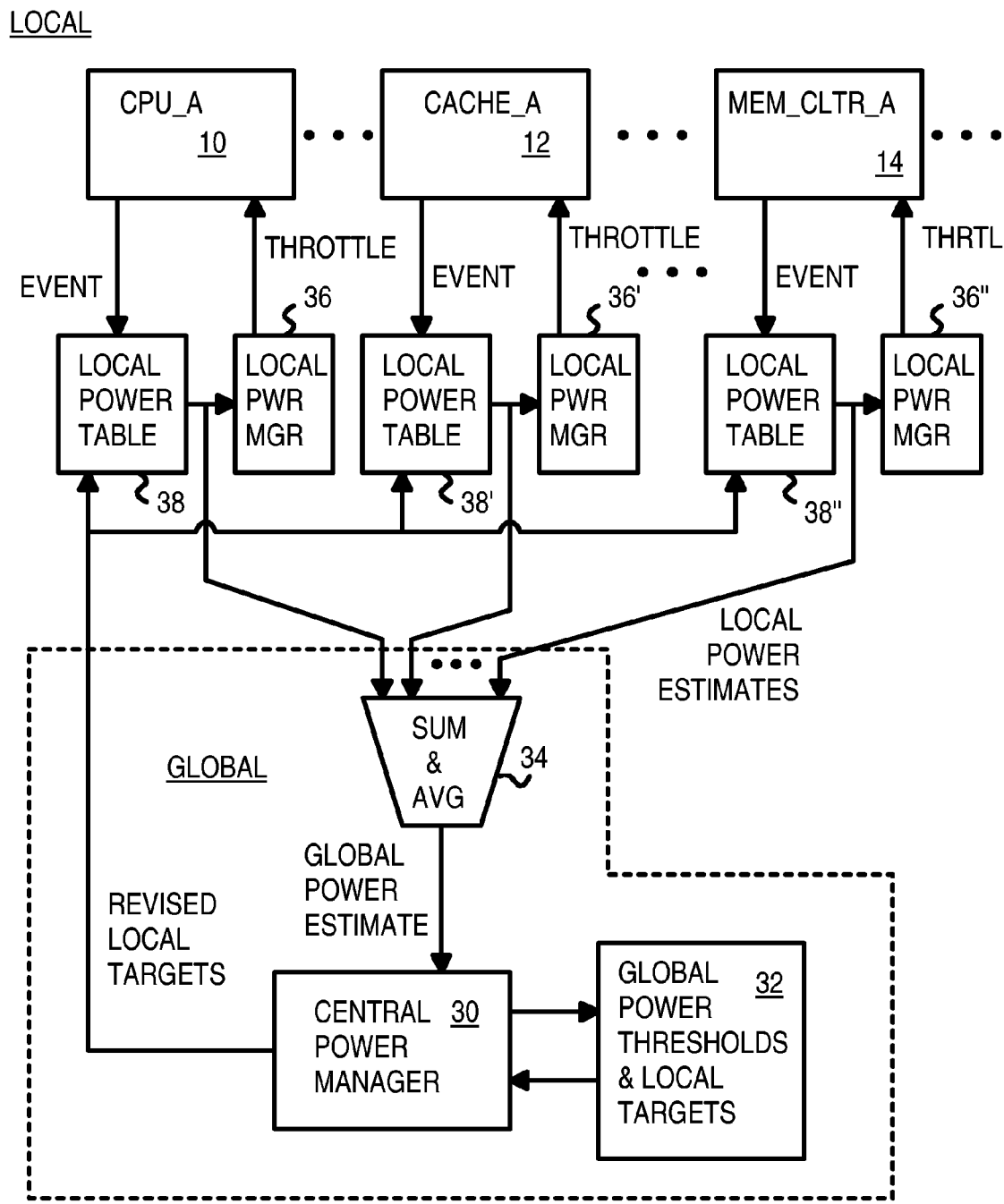
FIG. 2 is a block diagram of a multi-processor chip with a global power monitor and multiple local power managers.

FIG. 2 is a block diagram of a multi-processor chip with a global power monitor and multiple local power managers. Local blocks that perform functions include multiple CPU's, including processor core 10, multiple caches such as cache 12, and one or more memory controller 14. As these local blocks perform functions, they generate events. Events may be generated in a variety of ways, including, such as when a processor fetches or executes an instruction, when a cache access occurs, when the memory controller accesses an external memory, or when a local temperature sensor measures a temperature exceeding a defined threshold. Events may be signaled when some number of such functions occur, such as one event being generated for every 8 instructions fetched, or for every 64 bytes read.

When processor core 10 generates an event, the event is looked up in local power table 38. Local power table 38 stores power estimates for each kind of event. The local power estimate found in local power table 38 is sent to global power averager 34 in the global power management unit.

Likewise, when cache 12 generates an event, such as when cache 12 is read, the event is looked up in its local power table 38'. Local power table 38' stores power estimates for each kind of cache event. The local power estimate found in local power table 38' is also sent to global power averager 34 in the global power management unit.

When memory controller 14 generates an event, the event is looked up in local power table 38" for memory controller 14. Local power table 38" stores power estimates for each kind of event. The local power estimate found in local power table 38" is also sent to global power averager 34 in the global power management unit.

All the local power estimates from all the local power tables are summed by global power averager 34. An average such as a running average or exponential moving average (EMA) is also generated by global power averager 34. The average power filters out fluctuations in the instantaneous sum of local power estimates.

This average power from global power averager 34, the filtered sum of all local power estimates from local blocks, is the global power estimate. The global power estimate is sent to central power manager 30 and compared to one or more global power thresholds from global power table 32. When the global power estimate is below the global power thresholds, the chip is operating safely below the power limits and is not in danger of overheating. Operation can continue, with the local blocks continuing to estimate their local power and sending these local power estimates to global power averager 34 for summing and averaging. Central power manager 30 compares the global power estimate from global power averager 34 to global power thresholds from global power table 32 to ensure that the global power thresholds are not being exceeded.

When the global power estimate exceeds the global power thresholds from global power table 32, then power must be reduced. Local power targets are read from global power table 32 and are sent to local power tables 38, 38', 38". Local power managers 36, 36', 36" are also activated by central power manager 30.

Once activated, local power managers 36, 36', 36" compare local power estimates to the local power targets stored in local power tables 38, 38', 38". Local power managers 36, 36', 36" filter and average the local power estimates from local power tables 38, 38', 38" that are generated by events from the local block. When the local power average exceeds the local power target, local power managers 36, 36', 36" throttle their local block to reduce its power consumption.

For example, processor core 10 may be executing instructions at a high rate, sending many events to local power table 38 and causing the local power estimate generated by local power manager 36 to rise above the local power target for the local block, CPU_A. Then local power manager 36 throttles processor core 10 to reduce its power consumption.

Each of local power managers 36, 36', 36" operates independently of the others. Thus local power manager 36' may not have to throttle cache 12 while local power manager 36 is throttling processor core 10. The local power targets can be separately set by the system's programmer. This allows high-power local blocks such as processor core 10 to have a more restrictive local power target than other local blocks such as cache 12. It may be more effective to throttle a high-power local block than a local block that draws little power. The local power target for low-power local blocks can be set high enough so that the low-power local blocks do not have to be throttled.

Figure 3:
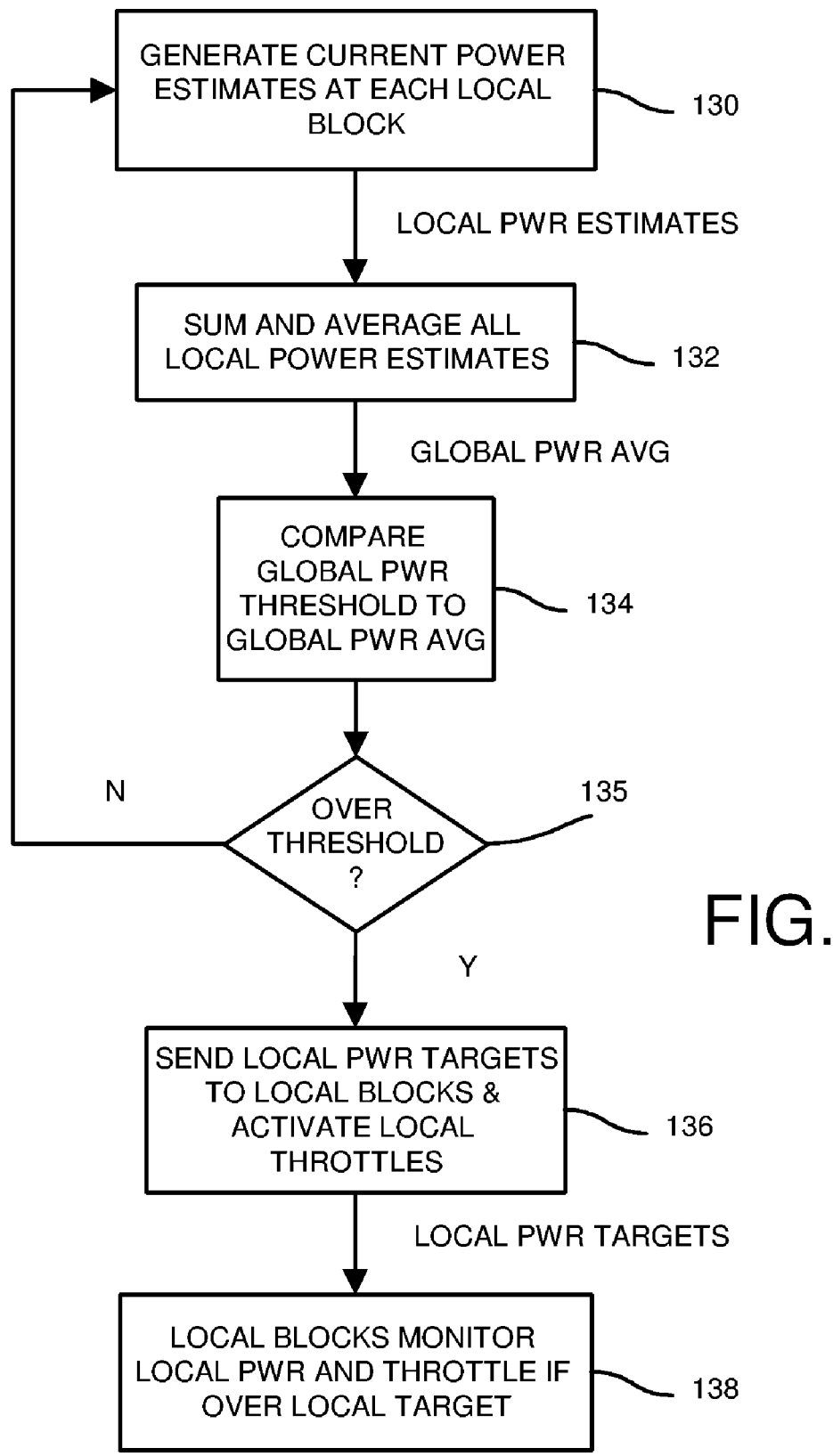
FIG. 3 is a flowchart of operation with global power estimates and local power targets using the global power monitor and multiple local power managers of FIG. 2.

FIG. 3 is a flowchart of operation of global power estimates and local power targets using the global power monitor and multiple local power managers of FIG. 2. Each of the many local blocks generates a local power estimate as events occur, step 130. These local power estimates are sent to the central power manager and summed and averaged or filtered, step 132, to generate a global power average.

The current global power average is compared to one or more global power thresholds or limits, step 134. When the current global power average exceeds a global power threshold, step 135, then power throttling by local blocks is activated. Local power targets are sent from the central power manager to the local power managers, step 136.

Once activated, each local power manager generates a local power average and compares it to the local power target for that local block. When the local power average is over the local target, the local power manager throttles the local block to reduce its power consumption, step 138. Power may be throttled by inserting or increasing a number of idle cycles for a period of time, by reducing execution frequency, stopping one or more clocks, pausing or delaying operation or memory accesses, etc.

Figure 4:
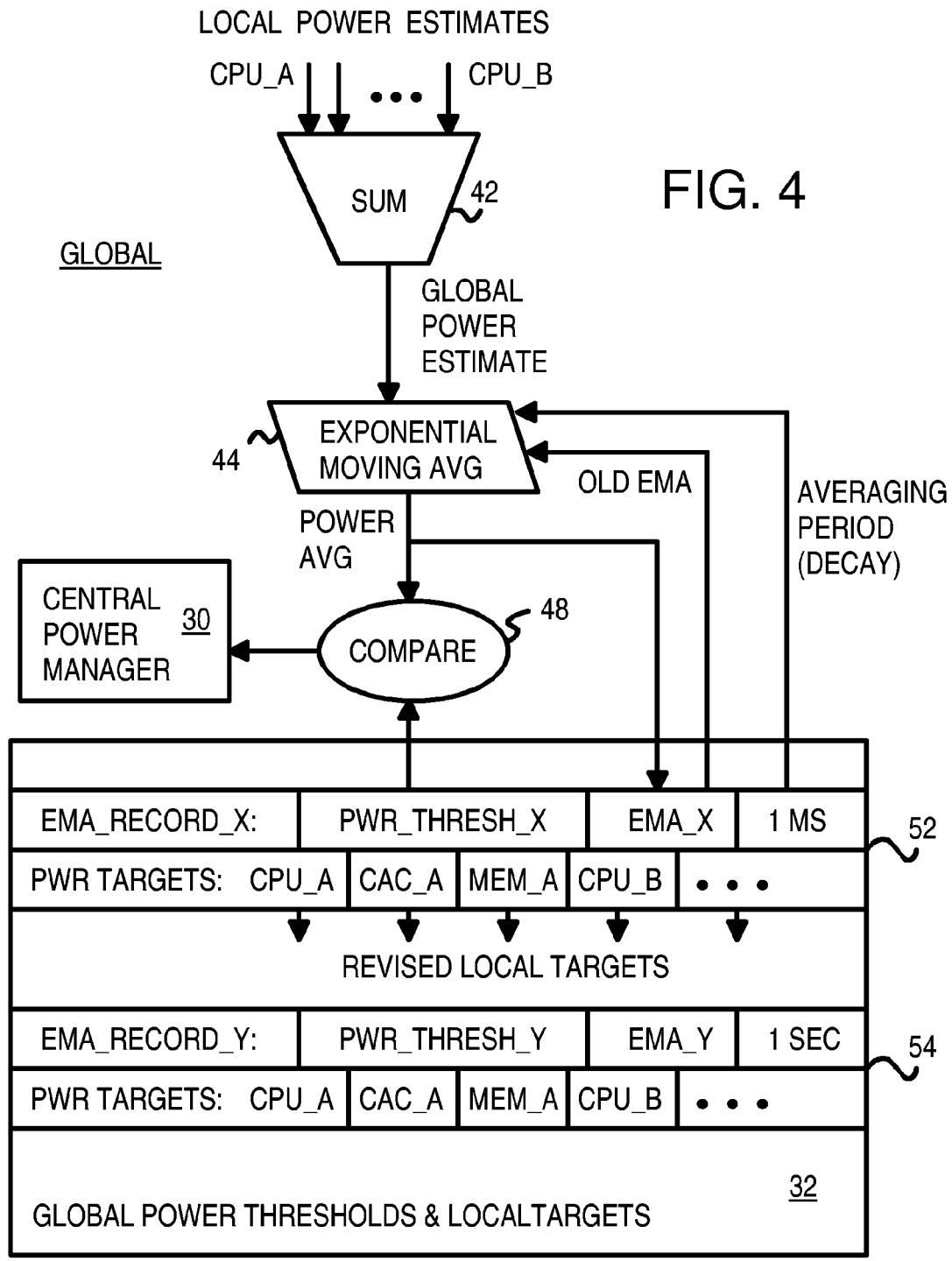
FIG. 4 shows the centralized global power manager in more detail.

FIG. 4 shows the centralized global power manager in more detail. Local power estimates from the many local blocks are received by global power adder 42, which forms a sum of all local estimates. This sum is the global power estimate for the current period of time, or sample period, and may be thought of as an instantaneous power estimate.

Averager 44 generates an exponential moving average (EMA) from the new global power estimate from global power adder 42. An old EMA, such as for the last sampling period, is read from a record in global power table 32, and a decay parameter is also read from the record. The old EMA and decay parameter are used by averager 44 to calculate the new average power. Bit-shifts may be used by averager 44 in response to the decay parameter to vary the amount (decay period) or speed of the averaging.

The new average power EMA from averager 44 is stored in the record in global power table 32 as the current EMA, over-writing the old EMA that was read. Comparator 48 compares the current EMA generated by averager 44 to the power threshold from the record read from global power table 32. When the new average power EMA is above the power threshold, central power manager 30 is alerted.

Central power manager 30 can then react to the global power average going over the global power threshold by activating local throttling. Local power targets are read from the record in global power table 32 and sent to the local power managers for the local blocks. The local power managers then monitor their local power estimates and throttle or reduce the power consumption of their local block when their local power target is over the local target.

The local power targets may differ for the various local blocks. For example, local targets for cache blocks may be higher or less restrictive than power targets for processor cores. Local power targets for some processor cores may differ from targets for other processor cores. Some local targets may be set to a maximum value to effectively disable local throttling for those local blocks.

More than one global power average may be generated. For example, one global power average may have a relatively slow averaging period of 1 second, while another global power average has a faster averaging period of 1 milli-second (1 ms). Each global power average has a separate record in global power table 32.

For example, first record 52 has a 1 ms averaging (decay) period while second record 54 has a 1 second averaging period. The global threshold for first record 52 is set to correspond to 100 Watts, while the global threshold for second record 54 is set to a lower 80 Watts. The second record is the system cooling limit and has a longer averaging time period, while the first record is a power-supply limit and has a faster averaging period.

Another (third) record could be added with an even faster averaging period to represent a capacitive limit of power that can be instantaneously supplied by capacitors, which is a higher instantaneous power than the power supply can supply over a longer period of time. A guard-band record could be added with a lower threshold to activate less-severe local power targets before a higher threshold is reached when more severe local power targets must be applied. The decay periods for the guard-band record could be the same as the first or second record, but have different values for the local power targets.

Local estimates may remain valid until the next time a global sum is generated. Alternately, for longer time periods in which local estimates change, global power adder 42 may keep a running sum of all local estimates as local events generate local power estimates that are sent to global power adder 42 and accumulated over the sampling period. Then several EMA's may be generated from one global power estimate from global power adder 42, but with different decay periods or shifts.

FIG. 5 shows a local power management unit in more detail. As events occur in the local block, such as cache or memory accesses or instruction fetching or execution, the event is looked up in local power estimate table 50. Estimated power or energy that is consumed by processing an event is stored in local power estimate table 50 for each kind of event that the local block can perform. When the local block performs the event, the power estimate for that event is output from local power estimate table 50 as the local power estimate. This local power estimate is sent to the global power manager and is summed by global power adder 42 (FIG. 4).

Ideally, normal operation does not cause the global power thresholds to be reached. Then local monitoring and throttling do not have to be activated. The local block simply looks up events in local power estimate table 50 and sends these estimates to the global power manager for summing. Power monitoring is performed globally.

However, when the global power threshold is exceeded, power must be reduced. Then the local power managers are activated and local power targets are sent. Each local power manager must monitor its local power and throttle the local block's operation to stay under the local power target.

When one of the global power thresholds is exceeded, a local power target is read from global power table 32 (FIG. 4) and sent to the local block's power manager to be stored in local power target table 62. Several local targets may be stored in local power target table 62 in different records. For example, fast record 56 contains power target A1 and uses a 1 ms averaging period, while slow record 58 stores a different local power target A2 with a slower 1 second averaging period. EMA_A1 is the faster 1 ms local power average stored in fast record 56, while EMA_A2 is the slower 1 second local power average stored in slow record 58.

Averager 64 generates an exponential moving average (EMA) from the new local power estimate from local power estimate table 50. An old local EMA, such as for the last sampling period, is read from a record in local power target table 62, and a decay parameter is also read from the record. The old local EMA and local decay parameter are used by averager 64 to calculate the new average power. Bit-shifts may be used by averager 64 in response to the decay parameter to vary the amount (decay period) or speed of the averaging.

The new local power EMA from averager 64 is stored in the record in local power target table 62 as the current EMA, over-writing the old EMA that was read. Comparator 68 compares the current EMA generated by averager 64 to the local power target from the record read from local power target table 62. When the new local power EMA is above the local power target, local power manager 60 is alerted.

Local power manager 60 reacts to the local power average going over the local power target by activating local throttling of the local block. Local power manager 60 can throttle or reduce the power consumption of their local block by a wide variety of methods. For example, local power manager 60 may activate inserting of a predetermined number of idle cycles over a period of time, or halting the clock to the local block for a period of time, such as X cycles for every 100 cycles. One or more clocks to the local block may also be slowed down or stopped, or instruction dispatches or memory accesses delayed.

Figure 6A:
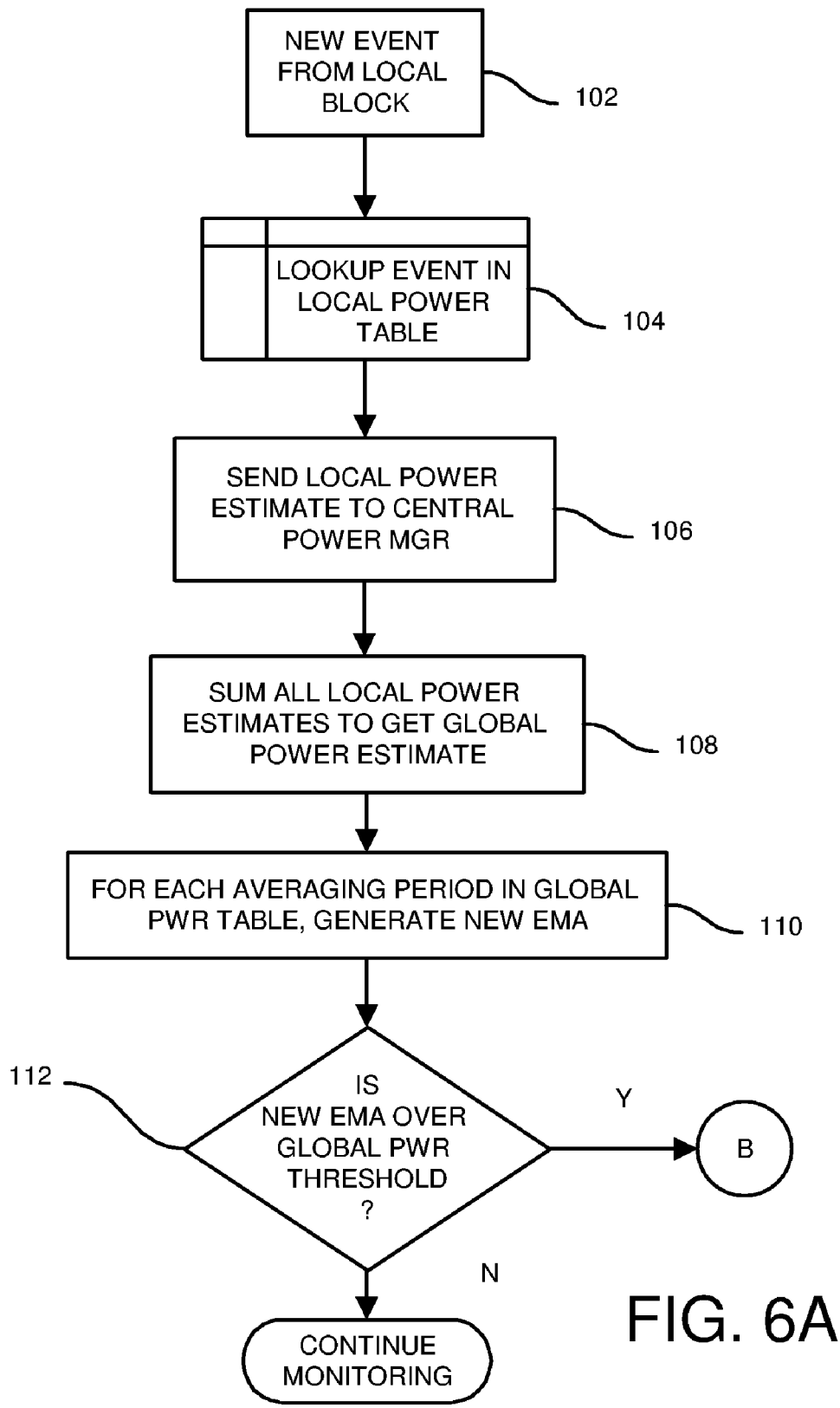
FIGS. 6A-B are a flowchart of global power monitoring and local throttling.
Figure 6B:
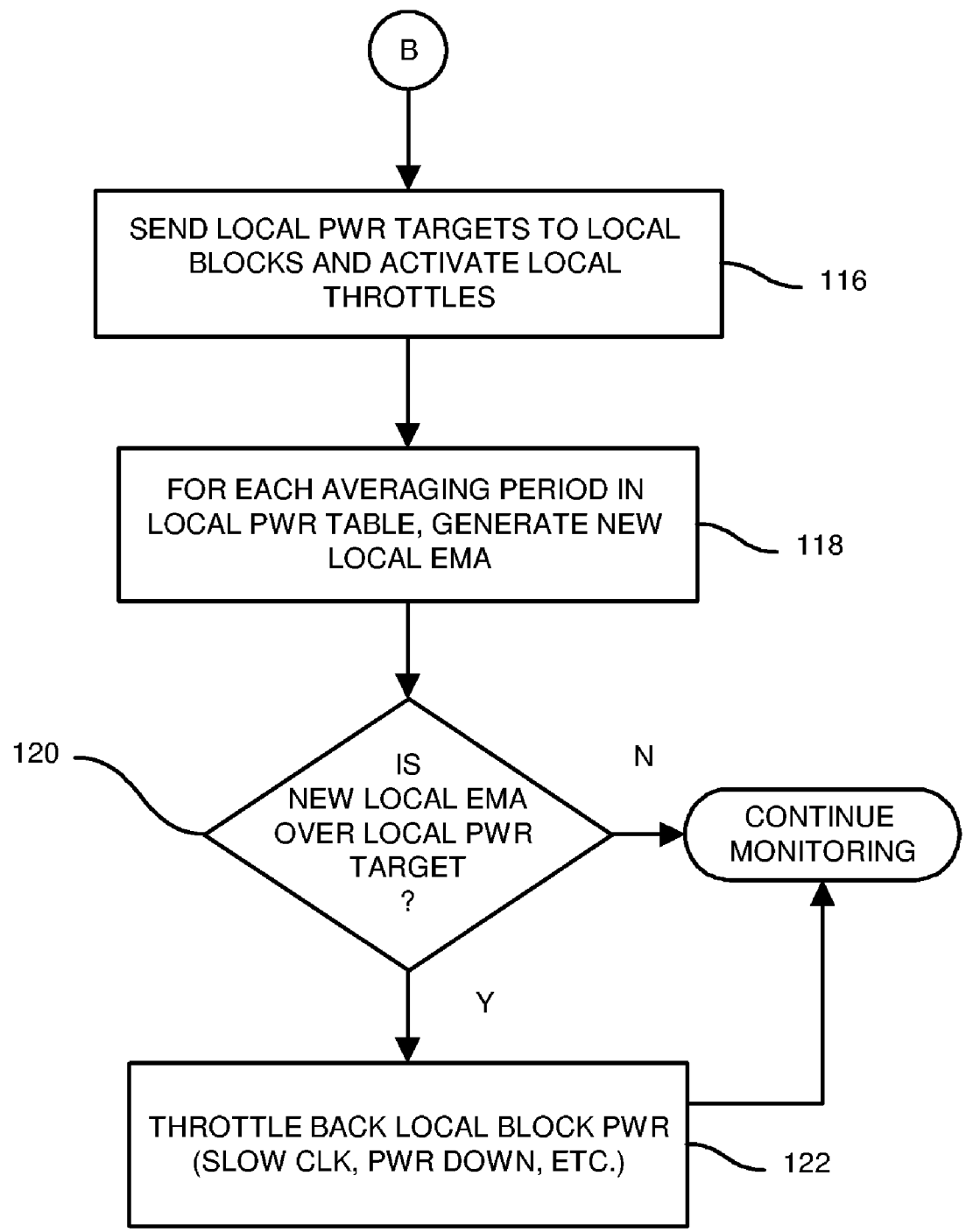

FIGS. 6A-B are a flowchart of global power monitoring and local throttling. FIG. 6A shows global monitoring. When an event occurs in a local block such as a processor or a cache, step 102, then the event is looked up in that local block's local power estimate table, step 104. The local power estimate is read from the local power estimate table and sent to the centralized global power manager, step 106.

The global power manager receives local power estimates from many local blocks and sums these local power estimates, step 108. A global power estimate is obtained for the current sampling period. There may be several different global power thresholds programmed into records in a global power table, and different decay periods for EMA's may be used. A stored EMA for each record is read, and the current global power estimate is averaged into the old EMA to get a new EMA that is stored in the record, step 110.

The averaging period for that record's EMA determines the shift amount or relative weighting of the current estimate and the old EMA. Slow averages use a smaller weighting of the current global power estimate and hence take longer to adjust, while faster averages use a larger weighting of the current power estimate and can change more rapidly.

The new EMA is compared to the global power threshold for that EMA's record in the global power table, step 112. When the threshold is not exceeded, global monitoring continues by repeating the steps of FIG. 6A.

When the global threshold for that EMA's record in the global power table is exceeded, step 112, then the steps of FIG. 6B are taken. The local power targets are read from the over-threshold EMA's record in the global power table and send to the local blocks for storage in the local power target tables. The local power managers are activated to monitor and throttle the local blocks, step 116. Local EMA's are generated from the local power estimate by the local power manager for different averaging periods, step 118.

The local EMA's are compared to the local targets, step 120. Local monitoring continues when the local targets are not exceeded. When a local target is exceeded, step 120, then local throttling occurs, step 122. Local throttling can be achieved by reducing a clock rate, access, or execution rate of the local block, stopping one or more clocks, or by powering down the local block for a period of time, or by using a lower-power mode for the local block. Lower-power modes for the local block may include techniques such as reducing the operating voltage(s) or adjusting the substrate bias voltage(s) for the local block. Local monitoring continues to determine if the local throttling was effective. The local throttle can be turned on and off as the local average oscillates above and below the local target.

Figures 7A, 7B:
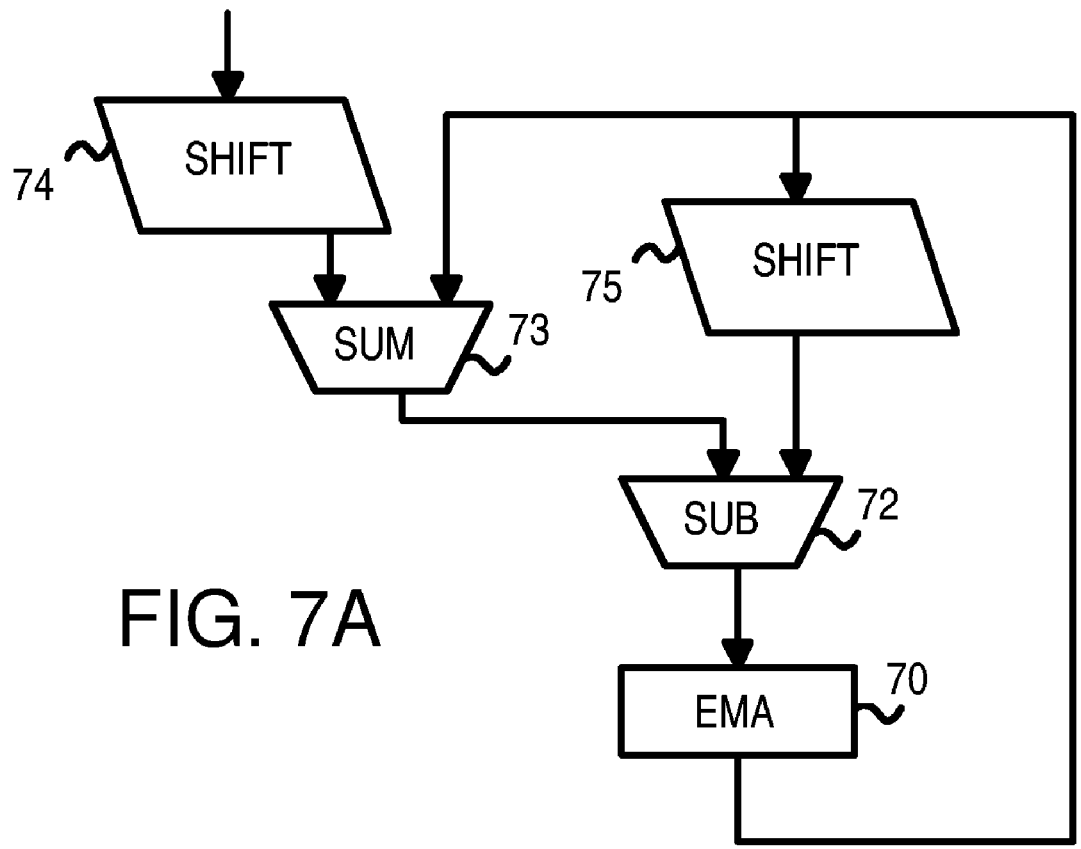
FIGS. 7A-B highlight generation of an exponential moving average (EMA) of a power value.

FIGS. 7A-B highlight generation of an exponential moving average (EMA) of a power value. In FIG. 7A, a new power estimate may be a local power estimate or may be a global power estimate that is the sum of many local power estimates. Shifter 74 shifts the new power estimate to the right by a number of bit-positions that is equal to a decay value. For a sample window of N samples or clock periods, the decay DECAY may be set as:

$$2^{DECAY}=(N-1)/2$$

Register 70 holds the old EMA value of this power estimate. The old EMA value may be read from a power table. Adder 73 sums the un-shifted old EMA from register 70 with the shifted new power estimate. Shifter 75 right-shifts the old EMA from register 70 by a number of bit-positions DECAY that is the same shift as performed by shifter 74. This shifted old EMA is subtracted by subtractor 72 from the sum from adder 73 to generate the new EMA for this power value. The new EMA can be stored in register 70 and written as the new EMA to a record in a power table.

The operation performed is:

New $EMA$=old $EMA$−(old $EMA/2^{DECAY}$)+(new sample/$2^{DECAY}$)

FIG. 7B shows an example of this operation. The new sample, or new power estimate is shifted to the right by one bit position. The old EMA is likewise right-shifted by one bit-position before subtracting, but not before adding. This has the same effect as exponentially averaging the new power estimate with the old EMA.

The EMA operation is simple to implement with a programmable processor or with hardwired logic, yet provides an accurate average for use in power management. The amount of averaging can be adjusted by adjusting the decay parameter DECAY.

ALTERNATE EMBODIMENTS

Several other embodiments are contemplated by the inventors. For example other kinds of local or global filters may be used besides EMA, such as a normal average of the last N samples. Local or global filters that are priority encoding filters or filters that drop or ignore the smallest local power estimates and only process the inputs can be used. The sum preceding the filter may ignore these smallest inputs, especially when they are much smaller than the largest inputs. Thus the sum may be a rough sum or estimated sum rather than a fully-inclusive and exact sum.

Local blocks that perform functions could be other kinds of blocks such as function-specific blocks and other processors besides CPU's, such as digital-signal processor (DSP) processors, caches, snoops, bus-interface units, I/O controllers, or memory controllers. Examples of local blocks that perform functions may include cache snoop tags, cache directory controllers, compression/decompression engines (codecs), security acceleration engines including those for secure-sockets layer (SSL), IO controllers, off-chip bus controllers, etc. These local blocks, which perform functions, may thus perform a wide variety of functions, including programmable, instruction-processing, memory lookup and referencing, security processing, compression, decompression, input-output, communications, and other functions. There may be other blocks included on the chip that do not include local power managers and thus do not participate in local or global power management.

The central power manager could perform global throttling. For example, the power-supply voltage to the entire chip could be reduced, or the global clock slowed down. The central power manager could receive external signals such as a temperature indicator or an external alarm signal from a power supply or power controller. A record in global power table 32 could have local targets that are activated when the external alarm or event occurs. Alternately, the external event could alter one or more global EMA's or could be fed into one of the local block's local power estimate table 50, perhaps being given a large weight. Multiple targets and multiple thresholds could be activated. Then the target or threshold with the lowest value may be triggered before those with higher values. A programmable local power target that is not revised by the central power manager may be added. This allows a local block to be power managed regardless of global management.

The central power manager may perform priority encoding of local power estimates rather than summing and filtering the local power estimates. The central power manager could receive local estimates and look then up in a table to determine what action to take. Various other kinds of central management may be performed.

Some events may not have an entry in local power estimate table 50 or may use a generic entry and a generic estimate. The power estimates may vary in accuracy and may be quite inaccurate for some events while being more accurate for other events. Local power managers could receive inputs from local sensors, such as a local temperature sensor for the temperature of the local block. Temperature inputs could generate events or replace local events or act as additional local events.

The local power estimates do not have to arrive at the global power averager at exactly the same time. The global power averager could keep a running sum of all local estimates that arrive during a period of time, such as before the next average is generated. Various pipelining may also be used. The format of records in the power tables may vary significantly, and records and data may be re-arranged or stored in nested structures such as linked lists or relational tables in a database. The power table itself could be stored on-chip or externally off-chip, or a combination thereof. The decay parameter may be allowed to have just a few values and may not necessarily be stored in the power table.

Comparison of thresholds and generation of filtered power averages could be performed at different times. For example, in the case of EMA, first all EMA's are generated for all decay periods, then each EMA is compared to the thresholds. Rather than store all local power targets in global power table 32, the local power targets could be stored in local power target tables 62 and then activated when needed.

The power estimates, thresholds, and targets may represent real energy or power values such as in Joules or Watts, or may be arbitrary values or weights that are relative to one another. The exact values may be set by simulation and later adjusted by experimentation or evaluation of actual chips. The programmer or system software may adjust these values by writing new values to global power table 32. Some records may be disabled, such as by using a disable bit or programming thresholds to a predetermined values such as 0000 or FFFF. The term power is sometimes used broadly to include energy, and sometimes may refer to energy consumed over an indefinite period of time rather than energy over a predetermined period of time.

Local power tables could have several records with several local targets and local EMA's, or could have just one target. Combination of events could also have an entry in the table. Different kinds of accesses or instructions could have different power estimates in local power table 38. Each local block can have a different local power table 38, or local power table 38 could be shared among several local blocks such as a cluster of one or more local blocks. The same or differing values may be programmed into local power tables 38 for different local blocks. A local or global power table may be programmable by software, or may be pre-defined, such as when constructed as a PLA, ROM, electrical fuses, laser fuses, or other non-software programmable structures.

Local power target table 62 could also contain fields that indicate the type of local throttling to be performed when the local target is exceeded. For example, a field could indicate the percentage of idle cycles to insert. More idle cycles could be inserted for violation of the slow-average local power target than for the faster-average target. Thus the amount of throttling is then increased when the local target for the slow moving average is violated. A field could indicate an amount to alter or an absolute target for the operating or substrate bias voltages.

Some processor cores may be allocated higher local power targets than other processor cores. For example, a first processor core may perform more critical operations such as executing operating system commands, while other processors execute instruction threads for less-important user programs. The power target for the first processor can be set higher than the local power targets for the thread-executing processors, causing the thread-processing processors to be throttled more than the first processor.

Rather than have the global summer sum all local power estimates from all local blocks, a subset of the local power estimates may be summed. For example, only power estimates from processor blocks may be summed while cache power estimates are ignored. More than one kind of global power average may be generated. One power average may include the sum of estimates for all processor blocks, while another power average may include the sum of estimates for cache blocks but not for processor blocks. This allows power to be separately monitored for processor and for cache local blocks.

The power estimate from the memory controller may include power consumed off-chip by an array of DRAM memory chips or memory modules. Other kinds of local blocks may also have their power estimated. For example, an I/O controller block may have its power estimated. The estimate may or may not include external power consumption, such as by external line or bus drivers.

Local power management may only be needed in rare circumstances, but not during normal operating loads. The local targets may be applied during exceptionally high load times and later removed after a period of time of lower global average power. The low-power modes of each local block may be programmable, such as throttling by 30%, 50%, etc. of the available cycles. The rate of servicing read or write requests to cache or memory may be reduced for throttling.

Other decay and EMA calculations and may be substituted. The EMA generator may be implemented in a variety of ways, including programmable logic, hardware logic gates and blocks, firmware, and software. Rather than have just two levels, local and global, a third level or a hierarchy of levels may be added. For example, several chips in a system could send chip-global power estimates to a system power manager that then performs functions of the global power manager.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A global-monitoring and local-throttling power manager comprising:

a plurality of local blocks that generate events as power is consumed;

a plurality of local power tables that have event entries storing local power estimates for the events;

a plurality of local power managers, each coupled to a local power table in the plurality of local power tables, for generating a local power estimate in response to an event from a local block that is power-controlled by the local power manager;

a global power summer that receives the local power estimates from the plurality of local power managers and generates a global power estimate as a sum of the plurality of local power estimates for the plurality of local blocks;

a global power filter, receiving the global power estimate from the global power summer, for generating a filtered global power estimate;

a global power table that stores a global power threshold;

a global comparator for comparing the filtered global power estimate to the global power threshold from the global power table and enabling a throttling mode when the filtered global power estimate exceeds the global power threshold;

the plurality of local power managers being enabled to reduce power consumption of the plurality of local blocks in response to enabling of the throttling mode by the global comparator;

wherein each local power manager comprises:

a local power target table that stores a local power target;

a local filter that receives the local power estimate read from the local power table and generates a filtered local power estimate; and a local comparator that compares the filtered local power estimate to the local power target from the local power target table and enables a reduced-power mode of the local block when the filtered local power estimate exceeds the local power target;

whereby each local power manager causes its local block to reduce power consumption in response to enabling of the throttling mode by the global comparator and the filtered local power estimate exceeding the local power target and whereby power is estimated and reduced locally and monitored globally.

2. The global-monitoring and local-throttling power manager of claim 1 wherein the local power target table contains a plurality of entries, each entry storing a local power target and a stored filtered local power estimate wherein the local filter reads the stored filtered local power estimate from the local power target table and combines the stored filtered local power estimate with the local power estimate from the local power table to generate the filtered local power estimate;

wherein the filtered local power estimate generated by the local filter overwrites the stored filtered local power estimate.

3. The global-monitoring and local-throttling power manager of claim 2 wherein the plurality of entries in the local power target table further store a filtering parameter that is further used by the local filter to generate the filtered local power estimate.

4. The global-monitoring and local-throttling power manager of claim 3 wherein the filtering parameter stored in entries in the local power target table is a decay period or is a value related to the decay period, wherein entries in the local power target table are for local filtering using differing decay periods.

5. The global-monitoring and local-throttling power manager of claim 4 wherein the local filter generates an exponential moving average (EMA).

6. The global-monitoring and local-throttling power manager of claim 1 wherein the global power table contains a plurality of records, each record for storing a global power threshold, a filtering parameter used by the global power filter, and a filtered global power estimate previously generated by the global power filter;

wherein each record in the global power table further stores a plurality of local power targets for sending to the local power target tables to be activated for local comparison when the throttling mode is enabled as a result of comparison of the global power threshold of the record.

7. The global-monitoring and local-throttling power manager of claim 6 wherein the global power filter generates an exponential moving average (EMA) as the filtered global power estimate.

8. The global-monitoring and local-throttling power manager of claim 1 wherein the plurality of local blocks comprise a plurality of processor local blocks that execute instructions and a plurality of cache local blocks that cache instructions and data for the plurality of processor local blocks.

9. The global-monitoring and local-throttling power manager of claim 8 wherein the global-monitoring and local-throttling power manager and the plurality of local blocks are integrated together on a single integrated circuit chip.

10. A machine-implemented method for global power monitoring and local power throttling at a plurality of local blocks comprising:

generating a plurality of local power estimates at the plurality of local blocks, a local power estimate for a local block representing an estimate of power consumed at the local block;

summing the plurality of local power estimates to generate a global power estimate;

filtering the global power estimate over an averaging period of time to generate a global average power;

comparing the global average power to a global threshold;

when the global average power exceeds the global threshold, activating a plurality of local power managers to monitor and throttle local blocks;

for a local block in the plurality of local blocks that has a local power manager that is activated, the local power manager filtering a local power estimate for the local block to generate a local average power for the local block, the local power manager comparing the local average power to a local power target and reducing power consumed by the local block when the local average power exceeds the local power target;

filtering the global power estimate over a second averaging period of time that differs from the averaging period of time to generate a second global average power;

comparing the second global average power to a second global threshold;

when the second global average power exceeds the second global threshold, activating the plurality of local power managers to monitor and throttle local blocks; and for a local block in the plurality of local blocks that has the local power manager that is activated, the local power manager also comparing the local average power to a second local power target and reducing power consumed by the local block when the local average power exceeds the second local power target, whereby multiple averaging periods are used for global threshold comparison and whereby power is estimated locally, globally summed and monitored, and locally throttled.

11. The machine-implemented method of claim 10 wherein generating a plurality of local power estimates comprises for each local block:

receiving an event generated by the local block; and looking up the event in a local power estimate table to find the local power estimate.

12. The machine-implemented method of claim 10 wherein filtering the global power estimate over an averaging period of time to generate a global average power comprises generating an exponential moving average (EMA).

13. The machine-implemented method of claim 10 further comprising, for a local block in the plurality of local blocks that has the local power manager that is activated, the local power manager filtering the local power estimate over a local averaging period of time to generate the local average power.

14. The machine-implemented method of claim 10 wherein filtering by the local power manager comprises generating an exponential moving average (EMA) of the local power estimate.

15. The machine-implemented method of claim 10 wherein the local power manager reducing power consumed by the local block when the local average power exceeds the local power target comprises:

increasing a number of idle cycles of the local block over a period of time;

increasing a time required to access a memory; or activating a low-power mode for a period of time.

16. A multi-level power management unit comprising:

a plurality of local-block clusters, each local-block cluster comprising:

(1) local block means for performing functions, each local block means capable of being placed into a low-power mode that has reduced power consumption;

(2) local power manager means for activating the low-power mode of the local block means when the local power manager means is enabled;

(3) local power estimate means for generating a local power estimate that is related to power consumption of the local block means when the local block means is performing functions;

and a global power manager that comprises:

sum means, receiving a plurality of the local power estimate from the plurality of local-block clusters, for generating a global power sum as a combination of the plurality of the local power estimates;

global filter means, receiving the global power sum, for generating a filtered global power sum; and global compare means for comparing the filtered global power sum to a global threshold and enabling the local power manager means in the plurality of local-block clusters to activate the low-power mode of the local block means to reduce power consumption;

wherein each local-block cluster further comprises:

(4) local filter means, receiving the local power estimate, for generating a filtered local power estimate;

(5) local compare means for comparing the filtered local power estimate to a local target and placing the local block means into the low-power mode when the filtered local power estimate exceeds the local target;(6) local power table means for storing a plurality of local records, each local record storing a local target for comparison by the local compare means, a prior filtered local power estimate previously generated by the local filter means, and a local filtering value used by the local filter means when generating the filtered local power estimate;

wherein the global power manager further comprises:

global power table means for storing a plurality of global records, each global record storing a global threshold for comparison by the global compare means, a prior filtered global power sum previously generated by the global filter means, and a global filtering value used by the global filter means when generating the filtered global power sum, whereby local power estimates are summed, filtered, and compared to the global threshold to enable the local power manager means to reduce power consumption.

17. The multi-level power management unit of claim 16 wherein the global filter means comprises exponential moving average (EMA) generation means and the global filtering value is a global decay value or is related to the global decay value;

wherein the local filter means comprises local exponential moving average (EMA) generation means and the local filtering value is a local decay value or is related to the local decay value.

* * * * *